H. R. GILSON.
MECHANISM FOR CRACKING NUTS.
APPLICATION FILED APR. 20, 1908.
928,958.
Patented July 27, 1909.
2 SHEETS—SHEET 2.
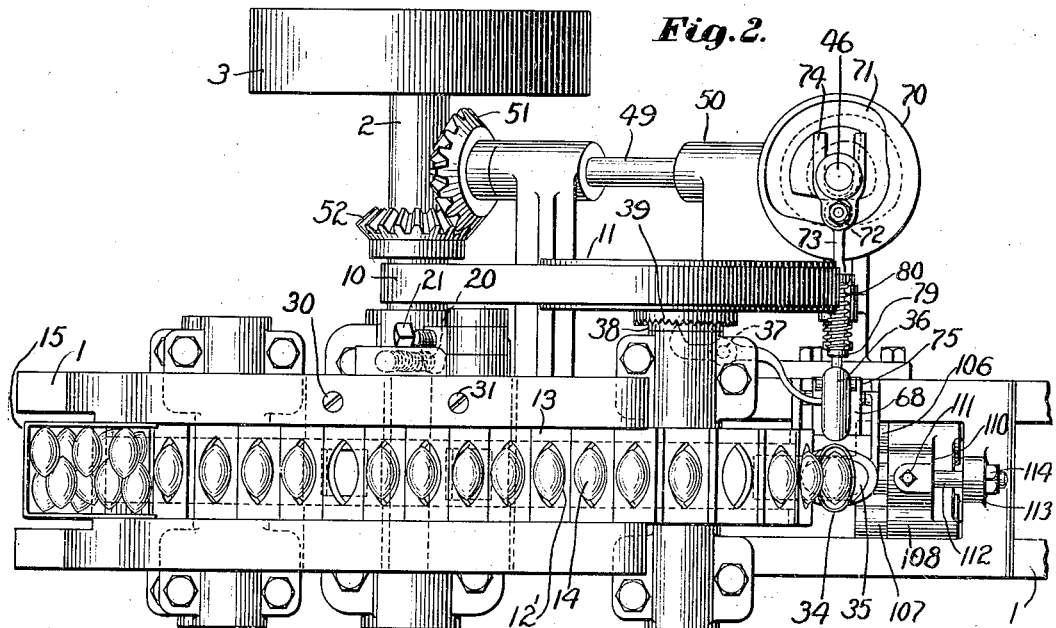
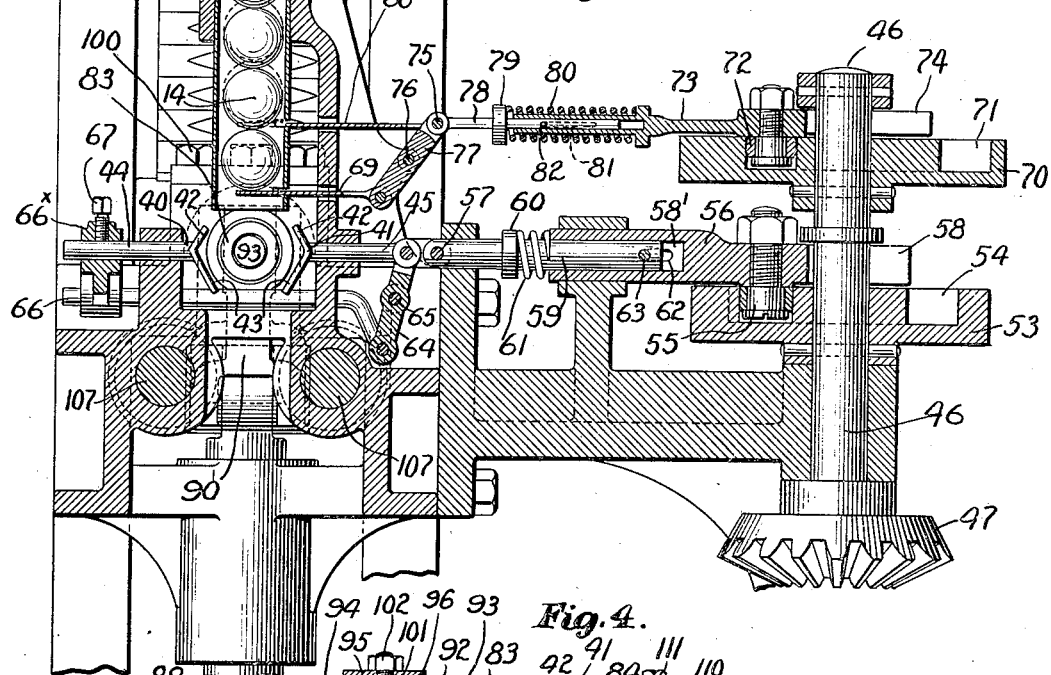
Witnesses:
Edwin T. Luce
Robert H. Kammler
Inventor:
Henry R. Gilson,
by Emery and Booth
Attys.

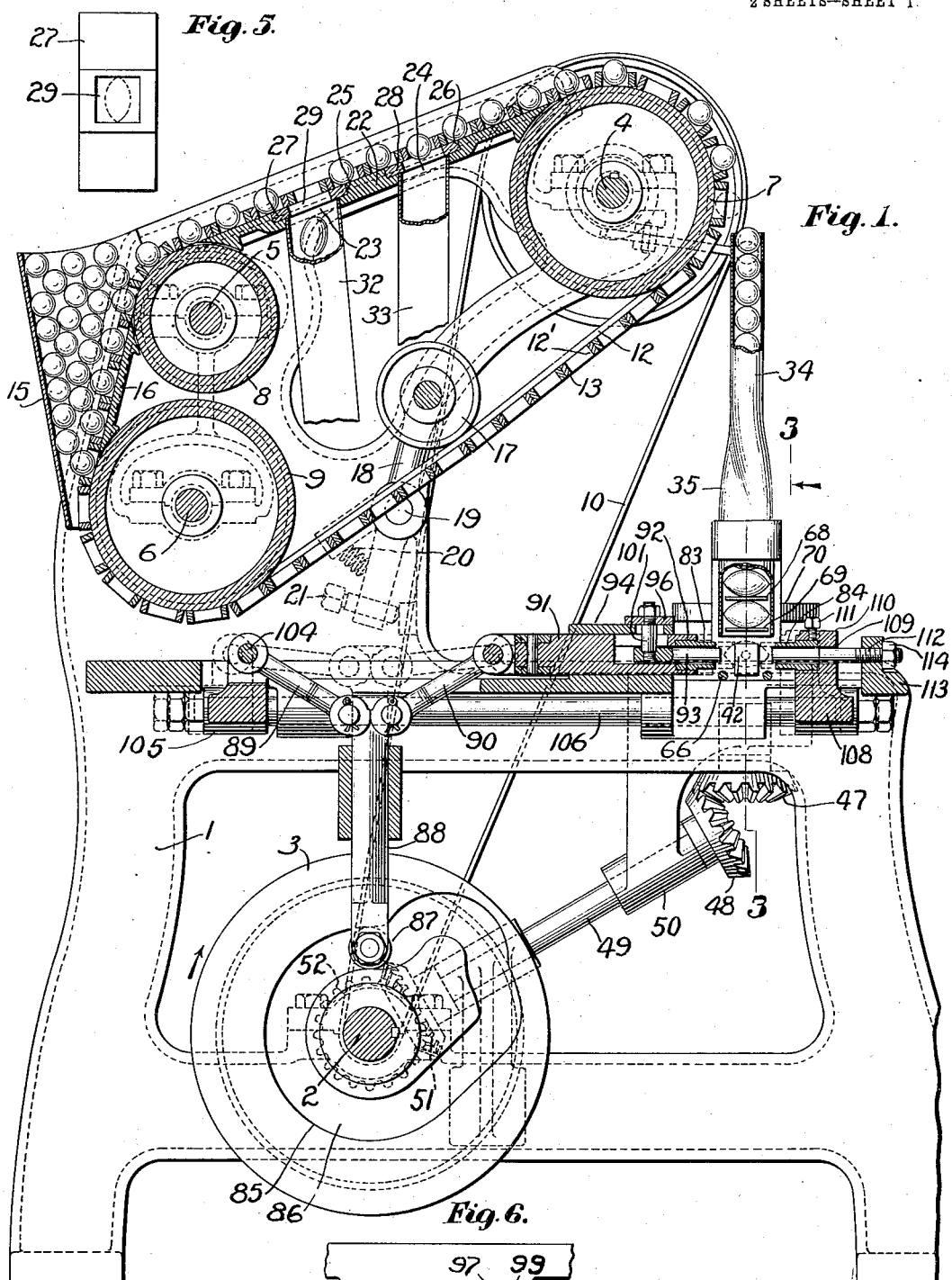
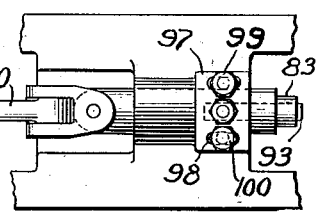

UNITED STATES PATENT OFFICE.

HENRY R. GILSON, OF NEEDHAM, MASSACHUSETTS, ASSIGNOR OF ONE-THIRD TO FRANK B. PRIEST, OF LITTLETON, MASSACHUSETTS, AND ONE-THIRD TO HARRY W. KNIGHTS, OF BROOKLINE, MASSACHUSETTS.

MECHANISM FOR CRACKING NUTS.

No. 928,958.      Specification of Letters Patent.      Patented July 27, 1909.

Application filed April 20, 1908. Serial No. 428,191.

*To all whom it may concern:*

Be it known that I, HENRY R. GILSON, a citizen of the United States, residing at Needham, in the county of Norfolk and State of Massachusetts, have invented an Improvement in Mechanism for Cracking Nuts, of which the following description, in connection with the accompanying drawings, is a specification, like numerals on the drawings representing like parts.

This invention relates to mechanism for cracking nuts and for similar purposes.

While my invention may be used for cracking nuts of various sorts, the present embodiment thereof is particularly adapted for cracking pecan nuts.

In order that the principles of the invention may be clearly understood, I have illustrated a single type or embodiment thereof in the accompanying drawings, wherein—

Figure 1 is a vertical, central section of one type of nut cracking mechanism embodying my invention; Fig. 2 is a plan view thereof; Fig. 3 is a longitudinal, vertical section upon an enlarged scale, taken upon the line 3—3 of Fig. 1; Fig. 4 is an enlarged sectional detail of the nut cracking mechanism proper shown in Fig. 1; Fig. 5 is a plan view of a nut selecting bridge piece; and Fig. 6 is a plan view of a portion of the stripping mechanism for the nut cracking means.

Referring more particularly to that single type or embodiment of the invention, herein selected for illustration, the framing of the machine, which may be of any desired form, material and construction, is indicated at 1 in Fig. 1. Preferably in the lower portion of the framing is mounted a main driving shaft 2 (see Figs. 1 and 2) having thereon a pulley 3, by which power may be applied from any suitable source.

Preferably in the upper portion of the framing are mounted (Fig. 1) shafts 4, 5 and 6 having thereon suitable pulleys 7, 8 and 9 respectively. Power may be directly applied from the main driving shaft to any one of said pulleys. Herein a belt 10 is represented as passing about the main driving shaft 2 and the pulley 11 upon the shaft 4. Encircling the pulleys 7, 8 and 9 is a nut conveying mechanism, herein represented as a belt 12 preferably composed of parallel side bands or strips 12' received in circumferential grooves in said pulleys and spaced apart a distance somewhat exceeding the length of the longest nuts, said bands or strips having secured thereto throughout their extent strips 13 of suitable material secured at their opposite ends to said bands or strips and each provided with an opening 14 of the general contour of the nut, as indicated most clearly in Fig. 2. In the case of pecan nuts, the said openings are elliptical in form. The pulleys 7, 8 and 9 may be disposed in any desired relation, but herein are so mounted that the nut conveying belt is somewhat upwardly directed, as clearly indicated in Fig. 1. A nut hopper 15 is disposed in suitable proximity to the nut conveying belt, and herein is adjacent a portion of the belt 16 (see Fig. 1) that is preferably but slightly inclined from the vertical.

Any suitable means may be employed if desired to maintain the nut conveying belt taut. Herein, for the purpose is indicated a pulley 17 engaging the inner surface of the belt, said pulley being mounted upon a lever 18 pivoted in the framing of the machine at 19. A tension spring 20 engages the opposite end of the lever to force the upper end thereof to the right viewing Fig. 1, thereby maintaining the belt taut. The tension of the spring may be adjusted in any suitable manner, as by the employment of a set screw 21, mounted in the outer end of the lever 18 and engaging the adjacent portion of the framing of the machine.

The upper run of the belt 12 between the pulleys 7 and 8 is received upon an inclined portion 22 of the framing, which preferably at a suitable point therein has one or more openings 23 and 24, as clearly represented in Fig. 1. Adjacent said openings, the framing of the machine is cut away or recessed upon the upper face, as indicated at 25 and 26 to provide preferably elongated rectangular seats for removable bridge pieces 27 and 28, one of which is shown in detail in Fig. 5. In the present type of the invention, the bridge piece 27 is provided with an opening 29 of a size to permit the discharge therethrough of the smallest sized nuts or nuts ranging from the smallest to any desired grade, and the bridge piece 28 is provided with an opening to permit the discharge of larger sized nuts, said opening not being large enough to permit the discharge of the nuts of the largest size which are conveyed onward by the belt 12 to the nut cracking mechanism. Preferably, the nut conveying belt is inclined so that each nut will roll in the opening wherein it is received and the nuts thereof will project equally with relation to the bridge pieces 27 and 28. While the openings in the bridge pieces may be graded in any desired manner, preferably and in this type of the invention the nuts are graded according to length and not according to diameter. As indicated in Fig. 2, the bridge pieces 27 and 28 are held in position respectively by screws 30 and 31. The recesses within which said bridge pieces are seated preferably extend to the edge of that portion of the framing in which they are formed, as indicated in Fig. 2, to permit the withdrawal of said bridge pieces when the screws 30 and 31 have been removed therefrom, the insertion if desired of bridge pieces for different sized openings, and the substitution of imperforate bridge pieces, in which event, all the nuts will be carried to the nut carrying mechanism. As indicated in Fig. 1, the nuts discharged from the bridge pieces 27 and 28 are conveyed by tubes 32 and 33 to any suitable receptacles.

The nuts to be cracked having been placed in the hopper 15 against the inner wall of the hopper and the belt 12 being moved in the direction of the arrow indicated in Fig. 1, some or all of the openings in the belt 12, during the onward movement thereof, receive therein nuts as indicated in Fig. 1, and convey the same toward the pulley 7, the nuts of the smallest grade and of the intermediate grades being discharged through the tubes 32 and 33.

Vertically disposed in the frame work, so as to receive nuts discharged by gravity from the belt 12 as the latter passes about said pulley, is a tube 34 herein represented as having a twisted portion 35 intermediate of its ends so as to turn the nuts entering said tube so that the longest diameter of the nut lies in the plane of the sheet viewing Fig. 1.

In the present type of the invention I have represented in Figs. 1 and 2 the preferred form of mechanism to prevent clogging, comprising a tapper 36 formed as a lever with an enlarged head and pivoted at 37 in the framing, the opposite end of the lever terminating in a tooth 38 engaging a toothed collar 39 mounted upon the shaft 4. During the rotation of said shaft, the tapper 36 tapping against the tube 34 effectually prevents clogging of the nuts therein. As represented most clearly in Fig. 3, at opposite sides of the lower or discharging end of the tube 34 are mounted a suitable number of nut centering devices 40 and 41, herein shown as two in number. Each of said devices has a plurality of angularly arranged faces and preferably comprises an upper nut engaging arm 42 and a lower nut engaging arm 43 of greater length than the upper arm in the direction of fall of the nut from the tube. The said centering devices are mounted upon plungers 44 and 45 respectively received for reciprocating movement in the frame of the machine in a direction toward and from the axis of the tube 34, but in a plane sufficiently beneath the lower end of the tube to permit the discharge of the bottom nut therefrom. Preferably the centering devices are so actuated at the proper time that the lower arms 43 receive between them a nut discharged from the tube 34, whereupon the said centering devices are further moved inwardly toward each other, so as slightly to lift the nut and accurately to center the same between the arms 41 and the arms 42. The centering devices may be given the described movements in any suitable manner. Herein for the purpose a vertically disposed shaft 46 is mounted in the framing and is provided at its lower end with a beveled gear 47, with which meshes a beveled gear 48 upon a shaft 49 suitably mounted in a hanger 50 and provided at its opposite end with a beveled gear 51 meshing with a similar gear 52 upon the main driving shaft 2 of the machine. As shown in Fig. 3, upon the shaft 46 is mounted a cam 53 having a cam groove 54 receiving a roll 55 removably mounted upon a link 56 suitably and pivotally connected as indicated at 57 with the plunger 45. Preferably the outer or rear end of the link 56 is forked as indicated at 58 to embrace the vertical shaft 46. Preferably the link 56 or other portion of the centering mechanism is provided with a yielding portion whereby the centering devices may yield if a nut of unusually large size be presented thereto. While any suitable means may be employed for this purpose, herein the link 56 is represented as having a longitudinal socket 58' to receive therein a second member 59 having thereon a collar 60, between which and the socketed portion of the link is received a coil spring 61 adapted to yield for the purpose stated. If desired, the socketed portion 58' of the ling 56 may be provided with an elongated slot 62 receiving therein a transverse pin 63 in the member 59 to maintain the parts in proper rotary alinement. As herein indicated, both members of the link are suitably guided in the framing of the machine.

As indicated clearly in Fig. 3, a lever 64 is pivoted at 65 in the framing of the machine, the upper end thereof being pivotally connected to the plunger 45 and the lower end thereof being pivotally connected to a forked link 66, the members whereof are spaced sufficiently to permit the discharge of the nut after the nut cracking operation. Upon the outer end of said forked links is mounted a member 66ˣ bored to receive the plunger 44, which is suitably secured in position therein by means of a set screw 67 in said member.

It will be apparent from the described illustration that a movement of the link 56 toward the left viewing Fig. 3 results in a movement in the same direction of the plunger 45 and centering device 41 carried thereby, and that through the lever 64 the plunger 44 and centering device 40 are correspondingly moved to the right.

Any suitable mechanism may be employed to discharge the nuts singly from the tube 34. Herein for the purpose I have indicated most clearly in Fig. 3 a valve mechanism comprising an upper valve plate 68 and a lower valve plate 69 adapted to be reciprocated toward and from the tube 34 and to enter the same through lateral slots therein, as indicated in said figure. Any suitable mechanism may be employed to operate the plates. For this purpose, there is mounted upon the shaft 46 (see Fig. 3) a cam 70 having a cam groove 71 therein receiving a roll 72 removably mounted upon a link 73, the rear end 74 whereof is forked to embrace said shaft 46 and the forward end whereof is pivotally connected as indicated at 75 to the plate 68. Suitably pivoted in the framing of the machine at 76 is a lever 77, the upper end whereof is loosely received upon the pin pivotally connected to the link 73 and the upper plate 68, and the lower end whereof is pivotally connected to the lower plate 69. If desired, the nut discharging mechanism may be provided with a yielding member to prevent breaking of the parts, if the nuts become improperly wedged in the tube 34 or are of such diameter as to interfere with the proper operation of the plates 68 or 69. For this purpose, I have herein indicated the link 73 as having one member thereof axially socketed to receive therein a second member 78 having thereon a shoulder 79 and between which and a suitable portion of the first member is interposed a coil spring 80 adapted to yield under pressure. If desired, the said first member may be provided with a longitudinal slot 81, receiving therein a pin 82 upon the member 78 to maintain the parts of the link from displacement.

With the described operation of the parts, it will be apparent that a nut will be received upon the lower plate 69 when the same is in the position within the tube 34 indicated in Fig. 3 and that in the rotation of the cam 70 the said lower plate 69 will be withdrawn from the tube 34 to discharge the nut into the centering devices 40 and 41, the upper plate 68 being moved inwardly as the lower plate is withdrawn to receive thereon the lowest undischarged nut. Upon the next outward movement of the upper plate 69, the said lowest nut is permitted to drop upon the lower plate 69 which is moved inwardly to receive the same, whereupon the described cycle of operations is repeated.

Preferably the centering devices 40 and 41 and the plates 68 and 69 of the nut discharging mechanism are so timed in operation that said centering devices approach each other just prior to the discharge of the nut from the tube 34, being moved sufficiently toward each other to permit the lower arms 43 to receive the nut as discharged from the tube, whereupon a further inward movement of said centering devices toward each other slightly elevates the nut so that the same is truly centered with respect to the nut cracking mechanism proper.

Preferably the nut conveying mechanism, herein consisting of the belt 12, moves at a rate of speed sufficiently high to result in the delivery of sufficient nuts to maintain a supply thereof in the tube 34 above the plate 68, notwithstanding the grading of the nuts, by the discharge of the smaller sizes through the bridge pieces 37 and 38.

While any suitable type of nut cracking mechanism proper may be employed, in the present type of the invention, I preferably use, as represented most clearly in Figs. 1 and 4, a pair of preferably ringlike or tubular members 83 and 84 disposed in relation to each other to receive therebetween the nut as it is held by the centering devices 40 and 41 and preferably by the ends thereof, so that the longest diameter of the nut is in the plane of the axis of said members 83 and 84.

Prior to the centering of a nut in the manner previously described, the said members 83 and 84 are sufficiently separated to be out of contact with the ends of the nut. When the nut has been centered, the said tubular members are moved inwardly toward each other so that the ends of the nut, which are usually more or less pointed, are received within the adjacent ends of the tubes, the leading edges whereof tightly grip the nut and upon the further inward movement of said tubes sever or cut the ends of the shell from the nut, the leading edges of said tubes being sufficiently sharp for this purpose and so compress the intermediate portion of the shell that such intermediate portion bursts or expands outwardly under the described compressive strain, after which the members 83 and 84 are withdrawn, permitting the nut and shell to fall together into any suitable receptacle to be thereafter readily separated by hand. The walls of the rings or tubes 83, 84 are of substantial thickness, as shown in Fig. 4, and thus form end faces preferably normal to the inner and outer surfaces of the said rings. The meeting edges of the said inner and outer surfaces and said end faces are sufficiently sharp to crush into or penetrate the shell of the nut, and after the shell is thus penetrated the end faces act to crowd or burst outward the shell from one end face to the other, thus completely clearing the shell from the nut save at the extreme tip caps, where the tips are connected to the inner webs of the nut that separate the portions of the kernel. By withdrawing these tip caps longitudinally the inner webs are withdrawn from the kernel without breaking the latter. The ends of the nut are cut or severed and the nut burst open as described solely by the annular edges of the members 83 and 84, in contradistinction to tapered sockets wherein heretofore the ends of the nut have been received. Any suitable means may be employed to operate the nut cracking members. Herein for the purpose (see Fig. 1) is mounted upon the main drive shaft 2 a cam 85 having upon one face thereof a cam groove 86 adapted to receive a roll 87 upon the lower end of a plunger 88, which is guided in its movement in the framing of the machine and having pivotally secured to its upper end the links 89 and 90 of a toggle mechanism. The opposite end of the link 90 is pivotally connected as shown to a block 91 mounted for sliding movement upon the framing of the machine, the forward end of said sliding block being recessed to provide an annular seat 92 (see Fig. 4) wherein is removably seated the tubular nut cracking member 83, which may be secured in position in any suitable manner, as by the employment of a set screw. The sliding block 91 is axially recessed in the rear of the seat 92 to receive therein a stripper or ejector 93 axially disposed within the tubular nut cracking member 83 as shown. As clearly shown in Fig. 4, the recess in the sliding block 91 in the rear of the seat 92 extends to the upper face of the block.

Preferably and as indicated in Figs. 1 and 4, a portion 94 of the framing overlies the sliding block and is slotted as indicated at 95. Overlying said slot is a plate 96 (see Figs. 4 and 6) having adjacent to the opposite ends thereof longitudinally disposed slots 97 and 98 receiving therein set screws 99 and 100, by means of which the said plate 96 may be secured in position and adjusted toward and from the nut when positioned between the centering devices. Depending from the plate 96 between the screws 99 and 100 is a pin 101, the upper screw threaded end whereof receives a nut 102 to secure the pin in position, and the lower end of which is screw threaded, as represented at 103, into the stripper or ejector 93. It will be apparent from the described construction, that the said stripper or ejector may be adjusted axially with respect to the nut cracking tube 83 to suit different sizes of nuts.

The link 89 of the toggle mechanism is pivotally connected, as indicated at 104 (see Fig. 1) to a block 105, to which is suitably secured a pair of parallel rods 106 and 107, as shown in Figs. 1 and 3. The opposite ends of said rods have secured thereto a block 108 (see Fig. 1), the upper portion of such block having a passage way 109 therein, annularly enlarged as indicated at 110 to receive therein the nut cracking tube 84, which may be secured in position in any suitable manner, as by set screw 111. Mounted within the said passage way 109 is a stripper or ejector 112, the outer end whereof is screw threaded into a portion 113 mounted upon the frame of the machine. By means of said screw threaded portion and the nut 114 an axial adjustment is afforded of said stripper or ejector to adapt the machine for use with nuts of various sizes.

With the described operation of parts, it will be apparent that the nut having been cracked by the described movement of said tubular members 83 and 84 toward each other, during the rotative movement of the cam 85, the continued rotation of the cam retracts said tubular members 83 and 84, moving them axially of said stationary strippers or ejectors 93 and 112, which strip the shell from said tubular members. It will be apparent that the said strippers or ejectors are so positioned as to be out of contact with the ends of the nut that is being operated upon, but that the said strippers as well as the nut cracking tubes 83 and 84 may be adjusted axially toward or from each other, according to the grade of nut that is being operated upon.

It will be apparent that the mechanism disclosed may be simply and readily changed so as to select for cracking nuts of any desired grade. This may be done by substituting for the bridges 27 and 28, bridges having openings therein of any desired size. Dependent upon the selected bridge, the tubes 83 and 84, as well as the ejectors 93 and 112, may similarly be adjusted, or, if desired, larger or smaller tubes may be substituted for the tubes 83 and 84 herein shown.

It will be apparent that a single operative may have in charge a number of different machines such as herein indicated and that the speed of such machines may be such as to result in a large output of cracked nuts.

Having thus described one type or embodiment of my invention, I desire it to be understood that although specific terms are employed they are used in a descriptive and generic sense and not for purposes of limitation, the scope of the invention being set forth in the following claims.

Claims.

1. Nut cracking mechanism comprising a ring like nut end supporting and severing member adapted to engage the shell of the nut closely adjacent one end thereof, said member having a shell bursting face, a support for the opposite end of the nut, the nut being unconfined between the line of severance and the said opposite support, means to move said member and said support relatively toward each other, thereby to sever the shell closely adjacent to the end engaged by said ring like member and to burst outward the entire part of the shell intermediate of said line of severance and said opposite support.

2. Nut cracking mechanism comprising two ring like nut end supporting and severing members adapted to engage the shell of the nut closely adjacent to the tips thereof, said members having opposed shell bursting faces, and means to move said members relatively toward each other, thereby to sever the shell closely adjacent to the tips and to burst outward the entire intermediate part of the shell.

3. Nut cracking mechanism comprising two ring like nut end supporting and severing members adapted to engage the shell of the nut closely adjacent the tips thereof, said members having opposed shell bursting faces, and means to move said members relatively toward each other, thereby to sever the shell closely adjacent the tips and to burst outward the entire intermediate part of the shell, in combination with nut centering means engaging the sides of the nut.

4. Mechanism for operating upon nuts comprising nut conveying mechanism, means to grade the nuts while being traversed by the conveying mechanism, means to discharge the nuts singly from the conveying mechanism, and shell cutting and shell bursting mechanism.

5. Mechanism for operating upon nuts comprising nut conveying mechanism, nut grading mechanism to which the nuts are presented by the conveying mechanism, means to discharge the nuts singly from the conveying mechanism, ring-like members engaging the discharged nuts adjacent opposite ends, while leaving the tips free, and means to move said members relatively toward each other to sever and burst the shell of the nut.

6. Mechanism for operating upon nuts comprising nut conveying mechanism, nut grading mechanism to which the nuts are presented by the conveying mechanism, means to discharge the nuts singly from the conveying mechanism, nut centering mechanism adapted to engage opposite sides of the nut, ring-like members having cutting edges and shell bursting faces engaging the discharged nut adjacent opposite ends, while leaving the tips free, and means to move said members relatively toward each other to sever the tip ends of the shell and to burst the shell.

7. Nut cracking mechanism comprising among its elements a movable conveyer having openings therein to receive the nuts singly, and of a size permitting the discharge of the nuts therethrough, a member situated beneath said conveyer and in close proximity thereto, said member being provided with an opening or openings to permit the discharge of the nuts of a predetermined grade therethrough, after the passage of the nuts through their respective openings in the conveyer and preventing the grading discharge of said nuts except through the opening or openings therein.

8. Nut cracking mechanism comprising among its elements a movable conveyer having openings therein, of a size permitting the discharge of the nuts therethrough, a member situated beneath said conveyer and in close proximity thereto, said member having one or more readily detachable plates provided with openings of a size permitting the discharge of nuts of a predetermined grade therethrough, whereby interchanged plates having different sized openings may be employed, said member preventing the grading discharge of said nuts except through the opening or openings in said plate or plates.

In testimony whereof, I have signed my name to this specification, in the presence of two subscribing witnesses.

HENRY R. GILSON.

Witnesses:
ROBERT L. WILLIAMS,
IRVING U. TOWNSEND.